United States Patent
Ma et al.

(10) Patent No.: US 12,088,743 B2
(45) Date of Patent: Sep. 10, 2024

(54) FOLDING TERMINAL STRUCTURE

(71) Applicant: ZTE Corporation, Shenzhen (CN)

(72) Inventors: Jian Ma, Shenzhen (CN); Shoujun Cai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 432 days.

(21) Appl. No.: 17/628,028

(22) PCT Filed: Aug. 25, 2020

(86) PCT No.: PCT/CN2020/111065
§ 371 (c)(1),
(2) Date: Jan. 18, 2022

(87) PCT Pub. No.: WO2021/120670
PCT Pub. Date: Jun. 24, 2021

(65) Prior Publication Data
US 2022/0263931 A1 Aug. 18, 2022

(30) Foreign Application Priority Data
Dec. 20, 2019 (CN) .......................... 201911322862.5

(51) Int. Cl.
*H04M 1/02* (2006.01)
(52) U.S. Cl.
CPC ....... *H04M 1/0216* (2013.01); *H04M 1/0249* (2013.01); *H04M 1/0268* (2013.01)
(58) Field of Classification Search
CPC ........ G06F 1/1613–1626; G06F 1/1637–1681; H04M 1/0214–0268
See application file for complete search history.

(56) References Cited

U.S. PATENT DOCUMENTS

2012/0165082 A1 6/2012 Kim et al.
2020/0293094 A1* 9/2020 Liu ....................... G06F 1/1652

FOREIGN PATENT DOCUMENTS

CN 105491193 A 4/2016
CN 107135288 A 9/2017
(Continued)

OTHER PUBLICATIONS

European Patent Office. Extended European Search Report for EP Application No. 20902646.7, mailed Jul. 22, 2022, pp. 1-7.
(Continued)

*Primary Examiner* — Ronald Eisner
(74) *Attorney, Agent, or Firm* — Vivacqua Crane, PLLC

(57) ABSTRACT

A foldable terminal structure and a mobile terminal are provided. The foldable terminal structure includes a main body with a first folding member, a second folding member and a connecting mechanism, and a flexible screen assembly that is disposed on a side of the main body. The connecting mechanism includes: a first support plate slidably connected to the first folding member; a second support plate slidably connected to the second folding member; a connecting rod fixing assembly rotatably connected to the first support plate and the second support plate, respectively, and constructed such that when the main body is unfolded, surfaces of the first support plate, the second support plate, and the connecting rod fixing assembly for supporting the flexible screen assembly are located in the same plane.

20 Claims, 4 Drawing Sheets

(56) References Cited

FOREIGN PATENT DOCUMENTS

| CN | 107831836 A | 3/2018 | | |
|---|---|---|---|---|
| CN | 108322567 A | 7/2018 | | |
| CN | 207777905 U | 8/2018 | | |
| CN | 208686793 U | 4/2019 | | |
| CN | 109780403 A | 5/2019 | | |
| CN | 109922181 A | 6/2019 | | |
| EP | 2728433 A1 * | 5/2014 | ........... | G06F 1/1616 |
| WO | 2018090870 A1 | 5/2018 | | |
| WO | 2019109858 A1 | 6/2019 | | |

OTHER PUBLICATIONS

International Searching Authority. International Search Report and Written Opinion for PCT Application No. PCT/CN2020/11065 and English translation, mailed Nov. 30, 2020, pp. 1-11.

The State Intellectual Property Office of People's Republic of China. First Office Action for CN Application No. 2019113228625 and English translation, mailed Dec. 27, 2022, pp. 1-10.

The State Intellectual Property Office of People's Republic of China. First Search Report for CN Application No. 2019113228625 and English translation, mailed Dec. 18, 2022, pp. 1-5.

* cited by examiner

FOLDING TERMINAL STRUCTURE

CROSS-REFERENCE TO RELATED APPLICATION

The present application is a national stage filing under 35 U.S.C. § 371 of international application number PCT/CN2020/111065, filed Aug. 25, 2020 which claims the priority to Chinese Patent Application 201911322862.5 filed on Dec. 20, 2019. The contents of these applications are incorporated herein by reference in their entirety.

TECHNICAL FIELD

The present disclosure belongs to the field of electronic technologies, and relates to a foldable terminal structure and a mobile terminal.

BACKGROUND

With the mass production of flexible screens and people's pursuit of large-screen intelligent terminals, a terminal structure that can be folded is used in the existing technology to resolve the problem that it is inconvenient to carry a large-screen intelligent terminal. FIG. 10 shows a foldable terminal structure. As shown in FIG. 10, the foldable terminal structure includes a main body and a flexible screen assembly. The main body includes a first structural member 11, a second structural member 12, and a bending assembly. The first structural member 11 and the second structural member 12 are connected together by the bending assembly. The flexible screen assembly is disposed on a folding inner side surface of the main body. The bending assembly includes a fixing member and a plurality of sliding rods. A first end of each of the sliding rods is rotatably connected to a side wall of the fixing member, and second ends 1322 of the two sliding rods are slidably connected to the first structural member 11 and the second structural member 12, respectively, so that there are slidable displacements between the fixing member and the first structural member 11 and the second structural member 12. Further, with the gradual unfolding of the main body, the second ends 1322 of the two sliding rods can gradually approach bottom walls of a first sliding cavity 111a and a second sliding cavity 121a respectively to enable a length of a folding outer side surface of the main body to gradually decrease, so that after the foldable terminal is unfolded, the folding outer side surface of the main body becomes a flat surface.

SUMMARY

According to some embodiments of the present disclosure, a foldable terminal structure may include: a main body with a first folding member, a second folding member and a connecting mechanism, and a flexible screen assembly that is disposed on a side of the main body, where the connecting mechanism includes: a first support plate slidably connected to the first folding member; a second support plate slidably connected to the second folding member;

and a connecting rod fixing assembly rotatably connected to the first support plate and the second support plate respectively, and constructed such that in response to the main body being unfolded, surfaces of the first support plate, the second support plate, and the connecting rod fixing assembly for supporting the flexible screen assembly are coplanar.

An embodiment of the present disclosure further provides a mobile terminal, including the foregoing foldable terminal structure.

DETAILED DESCRIPTION

Some embodiments of the present disclosure are described below in detail with reference to the accompanying drawings, and it should be understood that the some embodiments described below are intended only to describe and explain the embodiments of the present disclosure rather than limit the embodiments of the present disclosure.

Figure 1:
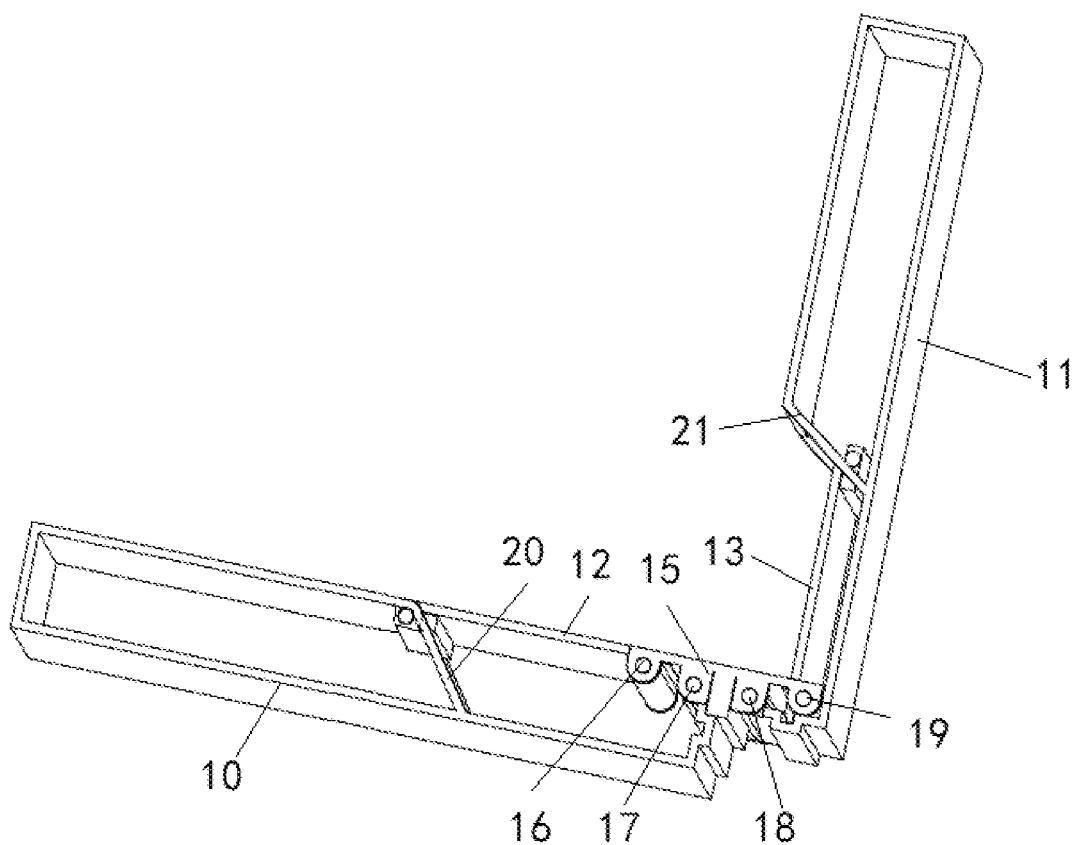
FIG. 1 is a perspective view of a foldable terminal structure being half unfolded according to the present disclosure.
Figure 2:
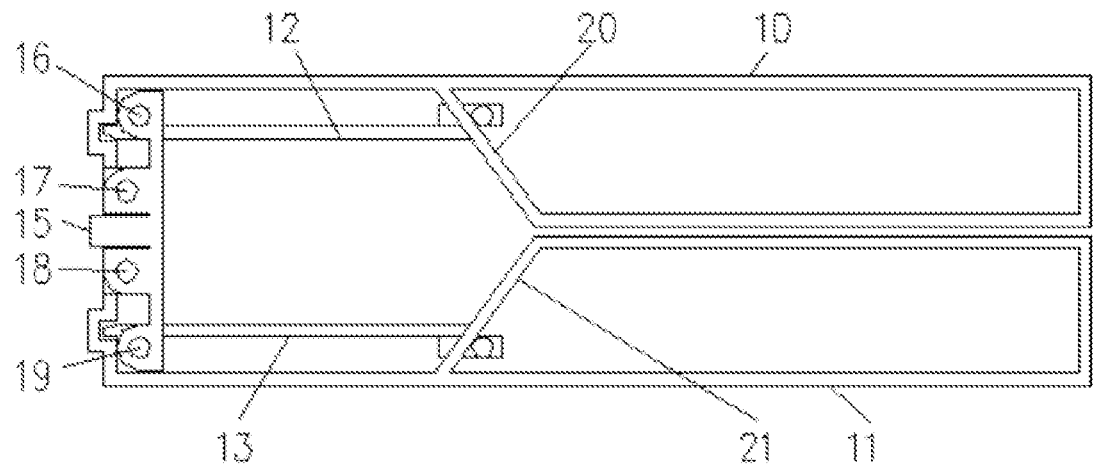
FIG. 2 is a schematic structural diagram of a foldable terminal structure being folded according to the present disclosure.

FIG. 1 and FIG. 2 are respectively schematic diagrams of a foldable terminal structure in a half-unfolded state and a folded state according to the present disclosure. As can be seen from FIG. 1 and FIG. 2, the foldable terminal structure of the present disclosure includes a main body 1 with a first folding member 10, a second folding member 11 and a connecting mechanism 2, and a flexible screen assembly (not shown) that is disposed on a side of the main body 1. The connecting mechanism 2 includes a first support plate 12 slidably connected to the first folding member 10; a second support plate 13 slidably connected to the second folding member 11; and a connecting rod fixing assembly 14 rotatably connected to the first support plate 12 and the second support plate 13, respectively. The connecting rod fixing assembly 14 is constructed such that when the main body 1 is unfolded, surfaces of the first support plate 12, the second support plate 13, and the connecting rod fixing assembly 14 for supporting the flexible screen assembly are coplanar.

In the present disclosure, with the foregoing structure, after the terminal structure is unfolded, a surface of the main body 1 for supporting the flexible screen assembly is a plane, and connections between the members are also located in a plane, so that there are no hollow pits or gaps at the connections, thereby avoiding the problems that the pressing sensitivity of pressing is affected and the structural reliability is reduced due to inadequate pressing caused by hollow pits at a bend. In addition, the implementation is simple, and manufacturing is easy.

In the main body 1 of the present disclosure, the connecting mechanism 2 integrally connects the first folding member 10 and the second folding member 11 that are symmetrically disposed on two sides of the main body 1. In the structure formed by the first folding member 10 and the second folding member 11, various components required for assembling a mobile phone terminal are included. The components include, but not limited to, a flexible screen, a motherboard, an antenna, a battery, a speaker, an earpiece, a motor, a sensor, and various connectors. For the accommodation of the various components, reference may be made to a manner of mounting components in the existing technology. Through the rotatable connection of the connecting mechanism 2, two folding members can be folded or unfolded, so that the terminal is folded or unfolded, thereby effectively resolving the problem that it is inconvenient to carry a large-screen terminal.

The first folding member 10 and the second folding member 11 of the present disclosure may be applied by the same structure, and symmetrically accommodated at two ends of the connecting mechanism 2. The structure of only the first folding member 10 is described below in detail with reference to FIG. 3.

Figure 3:
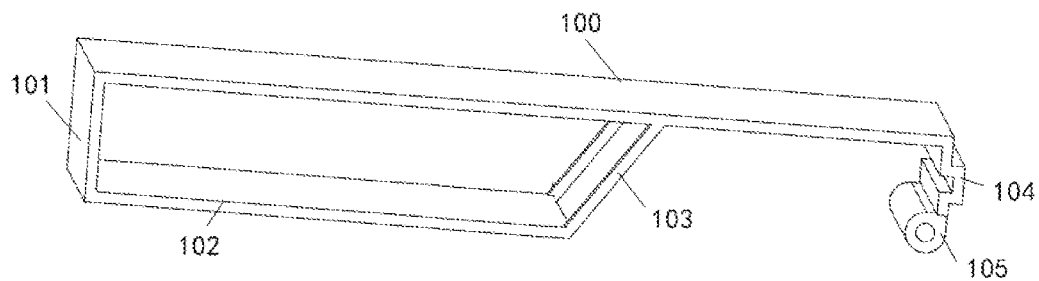
FIG. 3 is a perspective view of a first folding member from a perspective according to the present disclosure.
Figure 4:
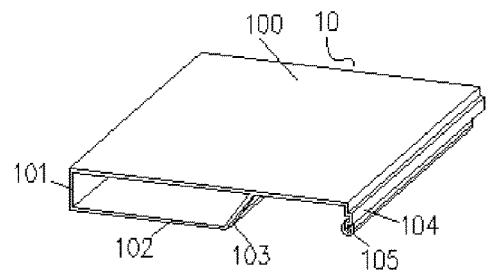
FIG. 4 is a perspective view of a first folding member from another perspective according to the present disclosure.

As shown in FIG. 3, the first folding member 10 includes a first plate body 100; a second plate body 102 parallel to the first plate body 100 and has a length shorter than that of the first plate body 100, where one end of the second plate body 102 is flush with one end of the first plate body 100 and is far away from the connecting mechanism 2; a side plate 101 having two ends fixedly connected to one end of the first plate body 100 and one end of the second plate body 102 respectively, where the side plate 101 is perpendicular to the first plate body 100; a pair of first rotation limiting rods 20 fixedly connected to two sides of the other end of the second plate body 102 and two corresponding sides of the first plate body 100 respectively, where each first rotation limiting rod 20 is disposed inclined relative to the second plate body 102, and has an angle with the second plate body of greater than 90 degrees; and a connecting plate disposed at the other end of the first plate body 100 and rotatably connected to the first support plate 12 and the connecting rod fixing assembly 14 respectively. The connecting plate has a same width as the first plate body 100. During assembly, the first plate body 100 is located on a side away from the flexible screen assembly, and the second plate body 102 is located on a side close to the flexible screen assembly, to support the flexible screen assembly.

The connecting plate includes a bending plate 104 with one end fixedly connected to the other end of the first plate body 100 and a folding member bushing 105 fixedly connected to the other end of the bending plate 104. The folding member bushing 105 is shorter than the bending plate 104 at both ends. That is, the two ends of the folding member bushing 105 are located on inner sides relative to two ends of the bending plate 104, and the two ends of the folding member bushing 105 shorter than the bending plate 104 may form clamping avoidance portions when connection is made to the connecting mechanism 2. The bending plate 104 has a first connecting portion perpendicularly connected to the first plate body 100, an accommodating portion fixedly connected to the first connecting portion and accommodating therein part of the first support plate 12, and a second connecting portion fixedly connected to the accommodating portion and the folding member bushing 105 respectively. The second connecting portion is located on an extension line of the first connecting portion.

The accommodating portion forms a step with the first connecting portion and the second connecting portion, where the step has an outer wall convex in a direction away from the side plate 101, so that an accommodating groove that can temporarily accommodate part of the first support plate 12 may be formed in an inner wall facing the side plate 101. An extending direction of the accommodating groove and an extending direction of the folding member bushing 105 are parallel to a width extending direction of the first plate body 100. In addition, an outer wall of the side plate connecting the accommodating portion and the second connecting portion may provide an abutting force to the connecting mechanism 2.

It is to be noted that a length and a width herein may be based on a mobile terminal structure. For example, a direction in which the mobile terminal structure can be unfolded is a direction of the length, and a direction perpendicular to the direction in which the mobile terminal structure can be unfolded is a direction of the width.

The first folding member 10 and the second folding member 11 of the present disclosure are connected together by the connecting mechanism 2 located therebetween. The connecting mechanism 2 includes the first support plate 12, the second support plate 13, and the connecting rod fixing assembly 14 that is located between the first support plate 12 and the second support plate 13. The first support plate 12 and the second support plate 13 have identical structures, and are symmetrically accommodated at two ends of the connecting rod fixing assembly 14. The first support plate 12 is slidably connected to the first folding member 10. The second support plate 13 is slidably connected to the second folding member 11.

Only the structure of the first support plate 12 is described below.

Figure 5:
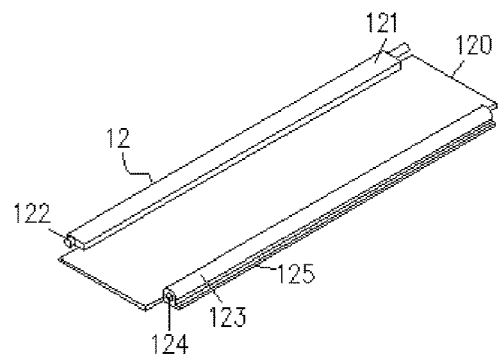
FIG. 5 is a perspective view of a first support plate from a perspective according to the present disclosure.
Figure 6:
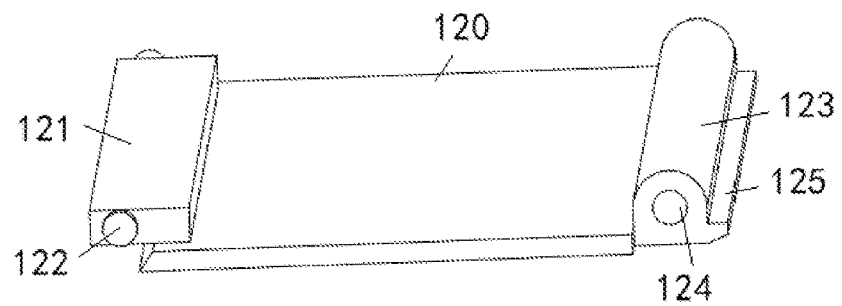
FIG. 6 is a perspective view of a first support plate from another perspective according to the present disclosure.

As shown in FIG. 5 and FIG. 6, the first support plate 12 includes a support plate body 120; a first connecting member 121 fixedly mounted on a surface of the support plate body 120 away from the flexible screen assembly and located at one end of the support plate body 120, the first connecting member 121 being constructed to contact the first folding member 10; and a second connecting member 123 fixedly mounted on the surface of the support plate body 120 away from the flexible screen assembly and located near the other end of the support plate body 120, the second connecting member 123 being constructed to be rotatably connected to the connecting rod fixing assembly 14.

The first connecting member 121 is a rectangular plate, at two end of which a pair of fixing shafts 122 that respectively contact a pair of first rotation limiting rods 20 of the first folding member 10 may be disposed. The second connecting member 123 is a strip-shaped bushing having one side in a semi-arc shape and a flat surface opposite to the semi-arc side which is fixed (or integrally formed) on the surface of the support plate body 120 away from the flexible screen assembly. A central hole 124 of the bushing is parallel to a central hole of the folding member bushing 105.

Figure 7:
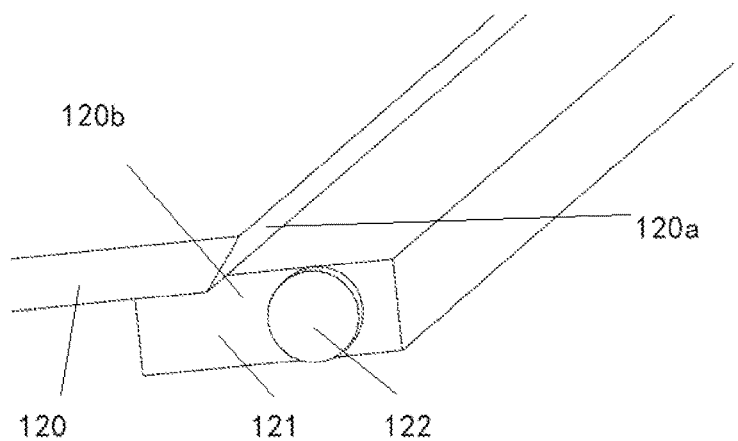
FIG. 7 is a partial enlarged view of a first support plate according to the present disclosure.

During design, both the first connecting member 121 and the second connecting member have a width smaller than that of the support plate body 120. An end surface at an end of the support plate body 120 may be an inclined surface 120a which is inclined toward the center of the support plate body 120 in a direction from a surface close to the flexible screen assembly to a surface away from the flexible screen assembly, so that the inclined surface 120a, a fixing shaft 122 on a corresponding side, and the first connecting member 121 define a clamping groove 120b for accommodating a first rotation limiting rod 20 on a corresponding side of the first folding member 10 (as shown in FIG. 6 and FIG. 7).

At the other end of the support plate body 120, there is still a certain distance between the second connecting member 123 and the other end of the support plate body 120. The distance forms an outwardly extending protrusion 125 with respect to the second connecting member 123. The protrusion 125 may be inserted in the accommodating groove of the bending plate 104 of the first folding member 10.

During manufacturing, the protrusion 125 may be machined with a chamfered surface that is inclined from the surface close to the flexible screen assembly toward an end surface of the other end of the support plate body 120 (that is, an end surface of the protrusion 125). The chamfered surface is provided to make it convenient for the first support plate 12 to rotate relative to the connecting rod fixing assembly 14 after the first support plate 12 is inserted in the connecting rod fixing assembly 14. When the mobile terminal structure is unfolded, the chamfered surface may be connected to the connecting rod fixing assembly 14 by a lap joint that has sufficient strength.

Figure 8:
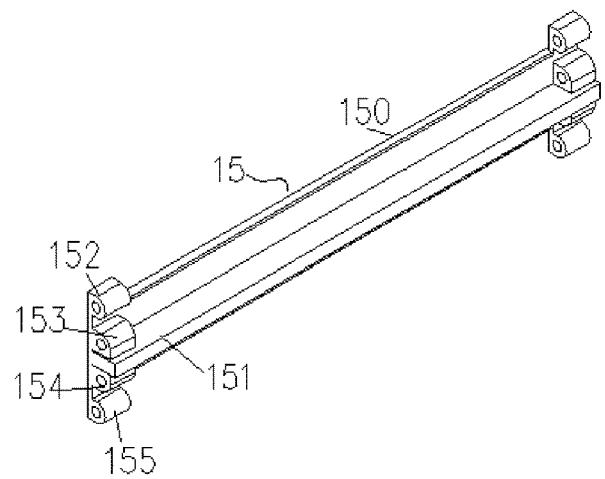
FIG. 8 is a perspective view of a rotating shaft fixing member according to the present disclosure.

As shown in FIG. 8, the connecting rod fixing assembly 14 located between the first support plate 12 and the second support plate 13 of the present disclosure includes a rotating shaft fixing member 15 and a first connecting rod 16, a second connecting rod 17, a third connecting rod 18, and a fourth connecting rod 19 that are rotatably connected to the rotating shaft fixing member 15, respectively. The connecting rods may be circular rods.

The first connecting rod 16 rotatably connects the rotating shaft fixing member 15 and the first support plate 12 together. The second connecting rod 17 rotatably connects the rotating shaft fixing member 15 and the first folding member 10 together. The third connecting rod 18 rotatably connects the rotating shaft fixing member 15 and the second folding member 11 together. The fourth connecting rod 19 rotatably connects the rotating shaft fixing member 15 and the second support plate 13 together.

Figure 9:
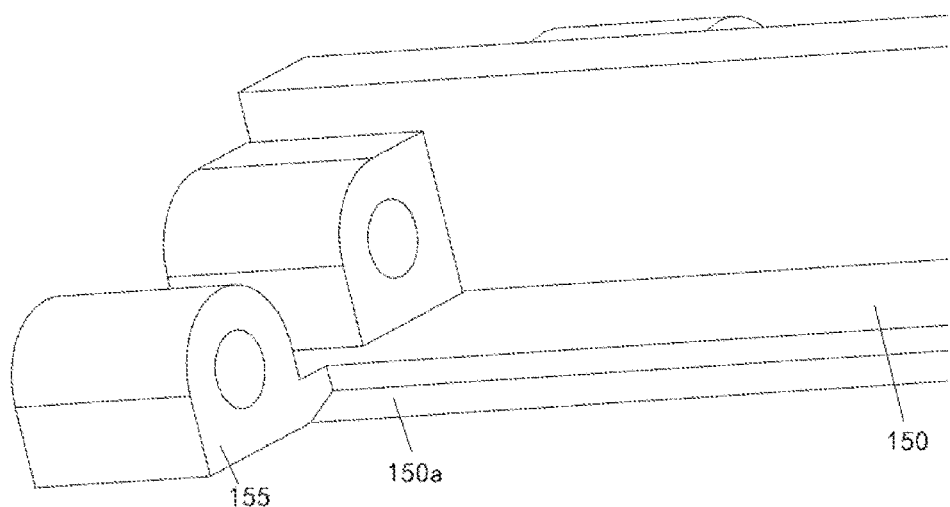
FIG. 9 is a partial enlarged view of a rotating shaft fixing member according to the present disclosure.
Figure 10:
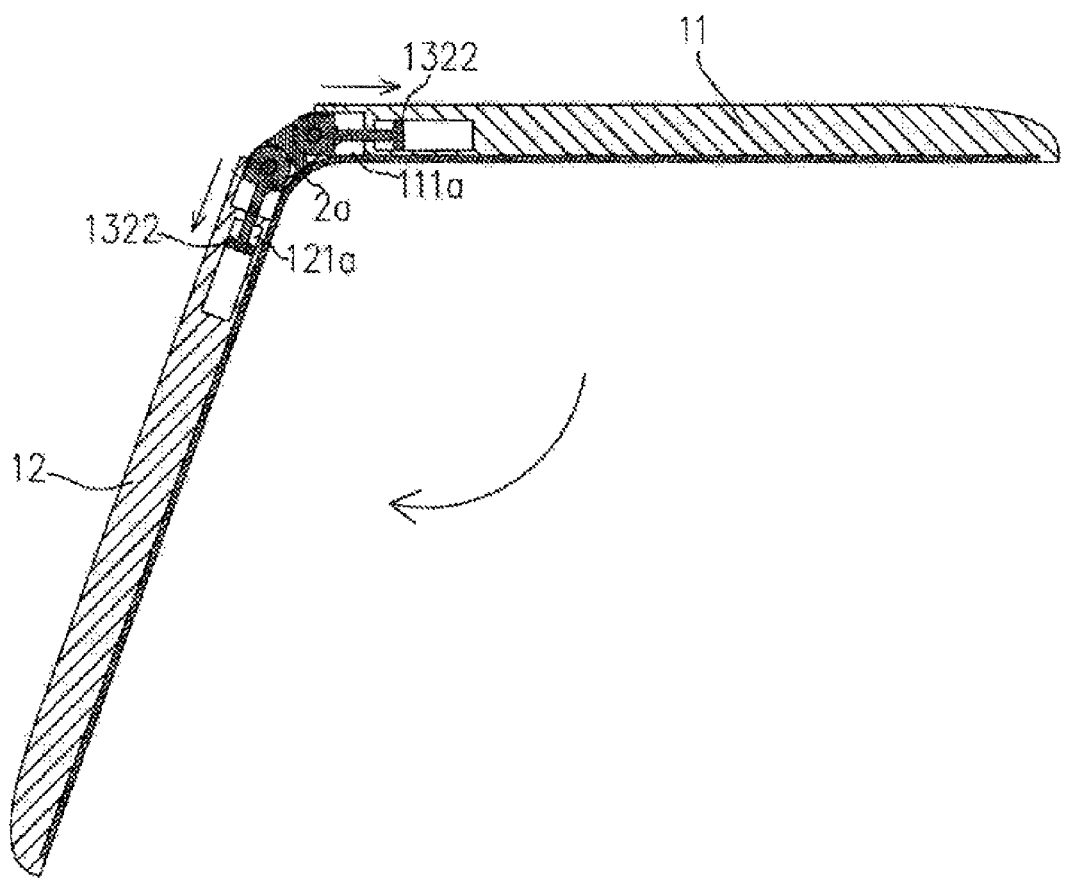
FIG. 10 is a perspective view of a foldable terminal structure in the existing technology.

Specifically, as shown in FIG. 8 and FIG. 9, the rotating shaft fixing member 15 includes a strip-shaped plate body 150; a support rib 151 fixedly mounted in the middle of the plate body 150, where an extending direction of the support rib 151 is consistent with a width direction of the first folding member; and four groups of bushings fixedly mounted on the plate body 150, where the four groups of bushings are symmetrical two by two about the support rib 151, and each group of bushings includes one pair of concentric bushings that are disposed on two sides of the plate body 150.

Two groups of bushings at an end of the support rib 151 close to the first support plate 12 are respectively a first group of bushings 152 for sleeving over two ends of the first connecting rod 16, and a second group of bushings 153 for sleeving over two ends of the second connecting rod 17. Two groups of bushings at an end of the support rib 151 close to the second support plate 13 are respectively a third group of bushings 154 for sleeving over two ends of the third connecting rod 18, and a fourth group of bushings 155 for sleeving over two ends of the fourth connecting rod 19.

Two groups of opposite bosses protruding outward are provided at two ends of the plate body 150 for connecting the first support plate 12 and the second support plate 13. Each group of bosses includes a pair of bosses disposed on the plate body 150 and located on two sides of the plate body 150 in a width direction. A pair of bushings in the first group of bushings 152 are respectively disposed on a pair of bosses facing the first support plate 12. A pair of bushings in the fourth group of bushings 155 are respectively disposed on a pair of bosses facing the second support plate 13.

During assembly, a central hole of the second connecting member 123 of the first support plate 12 is concentric with the pair of bushings in the first group of bushings 152. The second connecting member 123 is located between this pair of bushings. The first connecting rod 16 rotatably connects the second connecting member 123 and the rotating shaft fixing member 15 together, to enable the first support plate 12 to rotate around the first connecting rod 16 relative to the rotating shaft fixing member 15. A central hole of a second connecting member of the second support plate 13 is concentric with the pair of bushings in the fourth group of bushings 155. The second connecting member of the second support plate 13 is located between this pair of bushings. The fourth connecting rod 19 rotatably connects the second connecting member and the rotating shaft fixing member 15 together, to enable the second support plate 13 to rotate around the fourth connecting rod 19 relative to the rotating shaft fixing member 15.

In addition, an accommodating groove for accommodating the folding member bushing 105 of the first folding member 10 may be formed between the pair of bushings in the second group of bushings 153. That is, this pair of bushings correspond to a pair of clamping avoidance portions of the first folding member. The folding member bushing of the first folding member and this pair of bushings are concentric, and are rotatably connected together by the second connecting rod 17, to enable the first folding member to rotate around the second connecting rod relative to the rotating shaft fixing member. An accommodating groove for accommodating the folding member bushing of the second folding member 11 may be formed between the pair of bushings in the third group of bushings 154. That is, this pair of bushings corresponds to the pair of clamping avoidance portions of the second folding member. The folding member bushing of the second folding member and this pair of bushings are concentric, and are rotatably connected together by the third connecting rod 18, to enable the second folding member to rotate around the third connecting rod relative to the rotating shaft fixing member.

When a folding member rotates relative to the rotating shaft fixing member, one end of a support plate correspondingly connected to the folding member also rotates around a corresponding connecting rod. Along with the rotation of the folding member, the other end of the support plate moves along a pair of rotation limiting rods on the folding member in a direction from away from the flexible screen assembly toward the flexible screen assembly, until the entire structure is in an unfolded state. At this time, surfaces of the support plate, the folding member, and the rotating shaft fixing member for supporting the flexible screen assembly are coplanar.

It needs to be noted that all of the surfaces of the first folding member 10, the second folding member 11, the first support plate 12, the second support plate 13, and the rotating shaft fixing member 15 facing the flexible screen assembly are planar.

To implement seamless lap joints between the rotating shaft fixing member 15 and the first support plate 12 and between the rotating shaft fixing member 15 and the second support plate 13 when a mobile terminal is unfolded and ensure sufficient strength at the lap joints, in the present disclosure, lap joint grooves are further respectively provided at two ends of the rotating shaft fixing member 15 for implementing lap joints with the first support plate 12 and the second support plate 13. As shown in FIG. 9, each of two end surfaces of the plate body 150 includes a plane extending in a thickness direction of the plate body 150 and an inclined surface 150a connected to the plane. The inclined surface 150a is inclined from a surface of the plate body 150 facing the flexible screen assembly to a surface of the plate body 150 opposite the flexible screen assembly and intersects the plane, to form a lap joint groove with an opening facing away from the flexible screen assembly. When the mobile terminal is unfolded, the lap joint groove is lap to a chamfered surface of a boss of the corresponding support plate, and the inclined surface and the chamfered surface may be attached together, so that the surfaces of the support plate, the rotating shaft fixing member, and the folding member for supporting the flexible screen assembly are coplanar. After the mobile terminal is unfolded, the entire support surface is flat, thereby further avoiding hollow pits at the connections.

In summary, the first folding member 10 and the second folding member 11 of the present disclosure are integrally connected by the first connecting rod 16, the second connecting rod 17, the third connecting rod 18, the fourth connecting rod 18, and the rotating shaft fixing member 15. One end of the first support plate 12 is connected to the first connecting rod 16, and the other end of the first support plate 12 is connected to the first rotation limiting rod 20. One end of the second support plate 13 is connected to the fourth connecting rod 19, and the other end of the second support plate 13 is connected to a second rotation limiting rod 21. The first connecting rod 16, the second connecting rod 17, the third connecting rod 18, and the fourth connecting rod 19 are fixed on the rotating shaft fixing member 15.

When an external force is applied to the first folding member 10 or the second folding member 11, or a plurality of external forces are applied to both the first folding member 10 and the second folding member 11, the entire structure can be unfolded or folded and rotate along with the rotations at the connections of the connecting rods. The first folding member 10 and the second folding member 11 include components required for assembling a terminal, including, but not limited to, a flexible screen, a motherboard, an antenna, a battery, a camera, a speaker, an earpiece, a microphone, a motor, a sensor, and various connectors. The flexible screen assembly is fixed on the first folding member 10 and the second folding member 11, and acts along with the unfolding and folding of the first folding member 10 and the second folding member 11.

Compared with the existing technology, the foldable terminal structure in the embodiments of the present disclosure has the following advantages:

1. In the foldable terminal structure of the present disclosure, the connecting rod fixing assembly 14 is rotatably connected to the first support plate and the second support plate respectively, so that when the main body 1 is unfolded, the surfaces of the first support plate, the second support plate, and the connecting rod fixing assembly 14 for supporting the flexible screen assembly are coplanar. After the terminal structure is unfolded, the surface of the main body 1 for supporting the flexible screen assembly is planar, and connections between the members are also planar, so that there are no hollow pits at the connections, and during operations on the terminal structure, there is no inadequate pressing, thereby improving the pressing sensitivity.

2. The foldable terminal structure of the present disclosure has simple appearance, high implementability, and low costs.

The foldable terminal structure in the embodiments of the present disclosure are particularly applicable to various mobile terminals, for example, a foldable screen mobile phone, a flexible screen mobile phone, a tablet computer, an electronic book, a mobile game console, a mobile multimedia device, and the like. Correspondingly, the present disclosure further provides a mobile terminal, including the foldable terminal structure according to any of foregoing embodiments.

Although the present disclosure is described above in detail, the present disclosure is not limited thereto. A person skilled in the art may make modifications according to the principles of the present disclosure. Therefore, various modifications made according to the principles of the present disclosure should be understood to fall within the scope of protection of the present disclosure.

What is claimed is:

1. A foldable terminal structure, comprising:
   a main body with a first folding member, a second folding member and a connecting mechanism; and
   a flexible screen assembly disposed on a side of the main body, wherein the connecting mechanism comprises:
   a first support plate slidably connected to the first folding member,
   a second support plate slidably connected to the second folding member, and
   a connecting rod fixing assembly rotatably connected to the first support plate and the second support plate respectively, and constructed such that in response to the main body being unfolded, surfaces of the first support plate, the second support plate, and the connecting rod fixing assembly for supporting the flexible screen assembly are coplanar.

2. The foldable terminal structure of claim 1, wherein the first folding member and the second folding member have the same structure, and the first folding member comprises:
   a first plate body located on a side away from the flexible screen assembly;
   a second plate body parallel to the first plate body and located on a side close to the flexible screen assembly;
   a side plate having two ends fixedly connected to one end of the first plate body and one end of the second plate body respectively, the side plate being perpendicular to the first plate body;
   a pair of first rotation limiting rods fixedly connected to two sides of the other end of the second plate body and two corresponding sides of the first plate body respectively; and
   a connecting plate disposed at the other end of the first plate body and rotatably connected to the first support plate and the connecting rod fixing assembly, respectively.

3. The foldable terminal structure of claim 2, wherein the connecting plate comprises a bending plate having one end fixedly connected to the other end of the first plate body, and the bending plate is provided with an accommodating portion for accommodating therein part of the first support plate.

4. The foldable terminal structure of claim 3, wherein the connecting plate further comprises a folding member bushing fixedly connected to the other end of the bending plate and rotatably connected to the connecting rod fixing assembly.

5. The foldable terminal structure of claim 1, wherein both the first support plate and the second support plate have the same structure, and the first support plate comprises:
   a support plate body;
   a first connecting member fixedly mounted on a surface of the support plate body away from the flexible screen assembly and located at one end of the support plate body, the first connecting member being constructed to contact the first folding member;

a second connecting member fixedly mounted on the surface of the support plate body away from the flexible screen assembly and located near the other end of the support plate body, the second connecting member being constructed to be rotatably connected to the connecting rod fixing assembly.

6. The foldable terminal structure of claim 5, wherein a pair of fixing shafts are provided at two ends of the first connecting member; and the second connecting member is provided with a bushing, and a central hole of the bushing is parallel to a central hole of the folding member bushing of the first folding member.

7. The foldable terminal structure of claim 6, wherein an end surface at an end of the support plate body is an inclined surface, and the inclined surface, a fixing shaft on a corresponding side, and the first connecting member define a clamping groove for accommodating a first rotation limiting rod on a corresponding side of the first folding member.

8. The foldable terminal structure of claim 1, wherein the connecting rod fixing assembly comprises a rotating shaft fixing member, and a first connecting rod, a second connecting rod, a third connecting rod, and a fourth connecting rod that are rotatably connected to the rotating shaft fixing member, respectively.

9. The foldable terminal structure of claim 8, wherein the rotating shaft fixing member comprises: a plate body; a support rib fixedly mounted in the middle of the plate body, wherein an extending direction of the support rib is consistent with a width direction of the first folding member; and four groups of bushings fixedly mounted on the plate body, the four groups of bushings being symmetrical two by two about the support rib, and each group of bushings comprises one pair of bushings that are disposed on two sides of the plate body and are concentric.

10. The foldable terminal structure of claim 8, wherein surfaces of the first folding member, the second folding member, the first support plate, the second support plate, and the rotating shaft fixing member facing the flexible screen assembly are all planar.

11. The foldable terminal structure of claim 8, wherein the first connecting rod rotatably connects the rotating shaft fixing member and the first support plate together, the second connecting rod rotatably connects the rotating shaft fixing member and the first folding member together, the third connecting rod rotatably connects the rotating shaft fixing member and the second folding member together, and the fourth connecting rod rotatably connects the rotating shaft fixing member and the second support plate together.

12. The foldable terminal structure of claim 1, wherein in response to the main body being unfolded, there are no pits or gaps between the surface of the connecting rod fixing assembly for supporting the flexible screen assembly and the surfaces of the first support plate and the second support plate for supporting the flexible screen assembly.

13. A mobile terminal, comprising the foldable terminal structure of claim 1.

14. The foldable terminal structure of claim 2, wherein both the first support plate and the second support plate have the same structure, and the first support plate comprises: a support plate body; a first connecting member fixedly mounted on a surface of the support plate body away from the flexible screen assembly and located at one end of the support plate body, the first connecting member being constructed to contact the first folding member; a second connecting member fixedly mounted on the surface of the support plate body away from the flexible screen assembly and located near the other end of the support plate body, the second connecting member being constructed to be rotatably connected to the connecting rod fixing assembly.

15. The foldable terminal structure of claim 3, wherein both the first support plate and the second support plate have the same structure, and the first support plate comprises: a support plate body; a first connecting member fixedly mounted on a surface of the support plate body away from the flexible screen assembly and located at one end of the support plate body, the first connecting member being constructed to contact the first folding member; a second connecting member fixedly mounted on the surface of the support plate body away from the flexible screen assembly and located near the other end of the support plate body, the second connecting member being constructed to be rotatably connected to the connecting rod fixing assembly.

16. The foldable terminal structure of claim 2, wherein the connecting rod fixing assembly comprises a rotating shaft fixing member, and a first connecting rod, a second connecting rod, a third connecting rod, and a fourth connecting rod that are rotatably connected to the rotating shaft fixing member, respectively.

17. The foldable terminal structure of claim 9, wherein surfaces of the first folding member, the second folding member, the first support plate, the second support plate, and the rotating shaft fixing member facing the flexible screen assembly are all planar.

18. The foldable terminal structure of claim 9, wherein the first connecting rod rotatably connects the rotating shaft fixing member and the first support plate together, the second connecting rod rotatably connects the rotating shaft fixing member and the first folding member together, the third connecting rod rotatably connects the rotating shaft fixing member and the second folding member together, and the fourth connecting rod rotatably connects the rotating shaft fixing member and the second support plate together.

19. The foldable terminal structure of claim 2, wherein in response to the main body being unfolded, there are no pits or gaps between the surface of the connecting rod fixing assembly for supporting the flexible screen assembly and the surfaces of the first support plate and the second support plate for supporting the flexible screen assembly.

20. A mobile terminal, comprising the foldable terminal structure of claim 2.

* * * * *